(12) United States Patent
Bibera et al.

(10) Patent No.: US 10,225,078 B2
(45) Date of Patent: *Mar. 5, 2019

(54) MANAGING A DATABASE MANAGEMENT SYSTEM USING A BLOCKCHAIN DATABASE

(71) Applicant: International Business Machines Corporation, Armonk, NY (US)

(72) Inventors: Wyndell Love Bibera, Cainta (PH); James Arnold A. Faeldon, Bacoor (PH); Alexis V. Pantola, Las Pinas (PH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/429,121

(22) Filed: Feb. 9, 2017

(65) Prior Publication Data

US 2018/0227118 A1   Aug. 9, 2018

(51) Int. Cl.
| | |
|---|---|
| H04L 9/08 | (2006.01) |
| G06Q 40/04 | (2012.01) |
| G06F 17/30 | (2006.01) |
| H04L 9/06 | (2006.01) |
| H04L 9/30 | (2006.01) |
| H04L 29/06 | (2006.01) |

(52) U.S. Cl.
CPC ...... *H04L 9/0816* (2013.01); *G06F 17/30289* (2013.01); *G06F 17/30371* (2013.01); *G06Q 40/04* (2013.01); *H04L 9/0643* (2013.01); *H04L 9/30* (2013.01); *H04L 63/083* (2013.01)

(58) Field of Classification Search
CPC . G06F 17/30371; G06Q 40/04; H04L 9/0643; H04L 9/30; H04L 63/083
See application file for complete search history.

(56) References Cited

U.S. PATENT DOCUMENTS

| | | |
|---|---|---|
| 9,477,737 B1 | 10/2016 | Charyk et al. |
| 2006/0259518 A1 | 11/2006 | Lomet et al. |
| 2016/0071108 A1 | 3/2016 | Caldera et al. |
| 2016/0212146 A1 | 7/2016 | Wilson |
| 2017/0132625 A1 | 5/2017 | Kennedy |
| 2017/0228371 A1 | 8/2017 | Seger, II |

(Continued)

FOREIGN PATENT DOCUMENTS

WO   2001029777 A1   4/2001

OTHER PUBLICATIONS

McConaghy et al.; "BigchainDB: A Scalable Blockchain Database"; Jun. 8, 2016; <https://www.bigchaindb.com/whitepaper/bigchaindb-whitepaper.pdf>.

(Continued)

*Primary Examiner* — Oleg Korsak
(74) *Attorney, Agent, or Firm* — Christopher K. McLane

(57) ABSTRACT

Disclosed aspects relate to managing a database management system (DBMS). A central database to include a set of central data may be structured with respect to the DBMS. A blockchain database which is linked with the central database may be constructed with respect to the DBMS. A set of blockchain data may be established in the blockchain database corresponding to the set of central data of the central database. An access request may be received with respect to the DBMS. In response to receiving the access request, both the central database and the blockchain database may be maintained.

20 Claims, 6 Drawing Sheets

(56) References Cited

U.S. PATENT DOCUMENTS

2017/0264428 A1     9/2017   Seger, II
2017/0344988 A1    11/2017   Cusden et al.

OTHER PUBLICATIONS

Zyskind et al.; "Decentralizing Privacy: Using Blockchain to Protect Personal Data"; 2015; <http://www.enigma.co/ZNP15.pdf>.

Llanos, Juan; "Detecting Suspicious Activity on the Bitcoin Blockchain"; Skry; May 24, 2016; <https://skry.tech/post/detecting-suspicious-activity-on-the-bitcoin-blockchain>.

McConaghy et al., BigchainDB: A Scalable Blockchain Database (Draft), Feb. 15, 2015, ascribe GmbH, Berlin, Germany, 70 pages.

Bibera et al., "Managing a Database Management System Using a Blockchain Database", U.S. Appl. No. 15/851,879, filed Dec. 22, 2017, 53 pages.

Appendix P, List of IBM Patents or Patent Applications Treated as Related, 2 pages, dated Jan. 9, 2018.

Hearn, Mike, "Corda: A Distributed Ledger", Technical Whitepaper, Nov. 29, 2016, Version 0.5, 58 pages.

MANAGING A DATABASE MANAGEMENT SYSTEM USING A BLOCKCHAIN DATABASE

BACKGROUND

This disclosure relates generally to database management systems and, more particularly, relates to managing a database management system using a blockchain database. Databases are used to store information for numerous types of applications. Examples include various industrial, commercial, technical, scientific, and educational applications. Database management systems (DBMSs) are a typical mechanism for accessing data stored in a database. DBMSs are typically configured to separate the process of storing data from accessing, manipulating, or using data stored in a database. DBMSs often require tremendous resources to handle the heavy workloads placed on such systems. As such, it may be useful to manage a DBMS using a blockchain database.

SUMMARY

Aspects of the disclosure relate to managing a database management system (DBMS). A blockchain database may be used to provide an incorruptible database tampering detection system (IDT-DS) to detect tampering with respect to a set of data stored in a central database linked with the blockchain database. A partial copy of a set of data maintained in the central database may be stored in the blockchain database. In response to a portion of the set of data being modified within the central database, the changes may be synced to update the corresponding data within the blockchain database. The IDT-DS may be configured to monitor the set of data stored on the central database with respect to the partial copy stored on the blockchain database for inconsistencies. In response to detecting an inconsistency, the IDT-DS may log the inconsistency in the blockchain to notify an authorized user of the inconsistency.

Disclosed aspects relate to managing a database management system (DBMS). A central database to include a set of central data may be structured with respect to the DBMS. A blockchain database which is linked with the central database may be constructed with respect to the DBMS. A set of blockchain data may be established in the blockchain database corresponding to the set of central data of the central database. An access request may be received with respect to the DBMS. In response to receiving the access request, both the central database and the blockchain database may be maintained.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
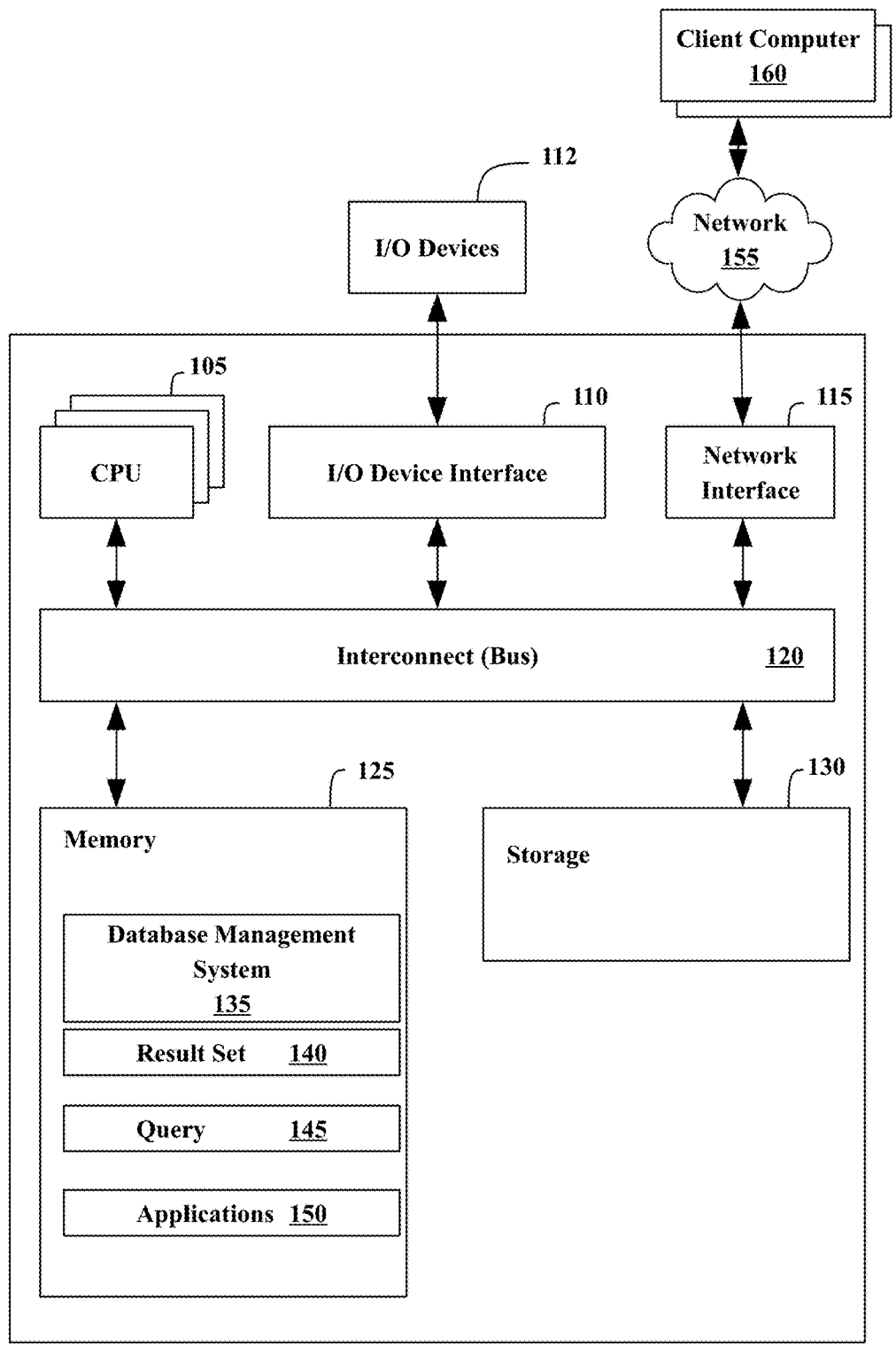
FIG. 1 illustrates an example representation of a computer system connected to a client computer via a network according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to managing a database management system (DBMS). A blockchain database may be used to provide an incorruptible database tampering detection system (IDT-DS) to detect tampering with respect to a set of data stored in a central database linked with the blockchain database. A partial copy (e.g., subset) of a set of data maintained in the central database may be stored in the blockchain database. In response to a portion of the set of data being modified within the central database, the changes may be synced to update the corresponding data within the blockchain database. The IDT-DS may be configured to monitor (e.g., compare, verify) the set of data stored on the central database with respect to the partial copy stored on the blockchain database for inconsistencies (e.g., potentially indicative of an unauthorized database modification or tampering with the central database). In response to detecting an inconsistency, the IDT-DS may log the inconsistency in the blockchain (e.g., using a write-once approach) to notify an authorized user of the inconsistency. Altogether, leveraging a blockchain with respect to a DBMS may be associated with benefits including data security and integrity, data management flexibility, and database performance and efficiency.

Databases are one component utilized in a variety of industries to facilitate the security and organization of data. Aspects of the disclosure relate to the recognition that, in some situations, the control of access and modification permissions for data in a database may rest in the hands of a few individuals (e.g., database administrators), such that unauthorized (e.g., fraudulent) changes made by those individuals may go undetected. Accordingly, aspects of the disclosure relate to utilizing a blockchain database to provide an incorruptible database tampering detection system (IDT-DS) to detect tampering with respect to a set of data stored in a central database linked with the blockchain database. As such, inconsistencies between the central database and the blockchain database may be identified to provide a notification of potentially unauthorized/fraudulent activity, and promote data security and integrity.

Aspects of the disclosure include a method, system, and computer program product for managing a database management system (DBMS). A central database to include a set of central data may be structured with respect to the DBMS.

A blockchain database which is linked with the central database may be constructed with respect to the DBMS. A set of blockchain data may be established in the blockchain database corresponding to the set of central data of the central database. An access request may be received with respect to the DBMS. In response to receiving the access request, both the central database and the blockchain database may be maintained.

In embodiments, a first central entry of the central database may be mapped to a first blockchain entry of the blockchain database to establish the set of blockchain data. In embodiments, a valid user authorization to carry-out the access request with respect to the blockchain database may be received in association with the access request. In embodiments, an inconsistency of the central database and the blockchain database may be detected, and the inconsistency may be stored in a permanent log. In embodiments, the set of central data of the central database may be compared with the set of blockchain data of the blockchain database to detect the inconsistency, a mismatch of a first central entry of the central database and a first blockchain entry of the blockchain database may be determined, and the mismatch may be recorded in a blockchain permanent log. In embodiments, in response to detecting the inconsistency, an alert of the inconsistency may be provided. Altogether, aspects of the disclosure may provide performance or efficiency benefits such as security, speed, flexibility, responsiveness, resource usage, and productivity. Aspects may save resources such as bandwidth, processing, or memory.

FIG. 1 illustrates an example representation of a computer system 100 connected to one or more client computers 160 via a network 155, according to some embodiments. For the purposes of this disclosure, computer system 100 may represent practically any type of computer, computer system, or other programmable electronic device, including but not limited to, a client computer, a server computer, a portable computer, a handheld computer, an embedded controller, etc. In some embodiments, computer system 100 may be implemented using one or more networked computers, e.g., in a cluster or other distributed computing system.

The computer system 100 may include, without limitation, one or more processors (CPUs) 105, a network interface 115, an interconnect 120, a memory 125, and a storage 130. The computer system 100 may also include an I/O device interface 110 used to connect I/O devices 112, e.g., keyboard, display, and mouse devices, to the computer system 100.

Each processor 105 may retrieve and execute programming instructions stored in the memory 125 or storage 130. Similarly, the processor 105 may store and retrieve application data residing in the memory 125. The interconnect 120 may transmit programming instructions and application data between each processor 105, I/O device interface 110, network interface 115, memory 125, and storage 130. The interconnect 120 may be one or more busses. The processor 105 may be a single central processing unit (CPU), multiple CPUs, or a single CPU having multiple processing cores in various embodiments. In one embodiment, a processor 105 may be a digital signal processor (DSP).

The memory 125 may be representative of a random access memory, e.g., Static Random Access Memory (SRAM), Dynamic Random Access Memory (DRAM), read-only memory, or flash memory. The storage 130 may be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 115 may be configured to transmit data via the communications network 155.

The memory 125 may include a database management system (DBMS) 135, a result set 140, a query 145, and applications 150. Although these elements are illustrated as residing in the memory 125, any of the elements, or combinations thereof, may reside in the storage 130 or partially in the memory 125 and partially in the storage 130. Each of these elements will be described in greater detail in accordance with FIG. 2.

The network 155 may be any suitable network or combination of networks and may support any appropriate protocol suitable for communication of data and/or code to/from the server computer system 100 and the client computer system 160. In some embodiments, the network 155 may support wireless communications. In other embodiments, the network 155 may support hardwired communications. The network 155 may be the Internet and may support Internet Protocol in some embodiments. In other embodiments, the network 155 may be implemented as a local area network (LAN) or a wide area network (WAN). The network 155 may also be implemented as a cellular data network. Although the network 155 is shown as a single network in the figures, one or more networks of the same or different types may be included.

The client computer system 160 may include some or all of the hardware and software elements of the computer system 100 previously described. As shown, there may be one or more client computers 160 connected to the computer system 100 via the network 155. In some embodiments, one or more client computers 160 may send a query 145 by network 155 to computer system 100 and receive a result set 140.

Figure 2:
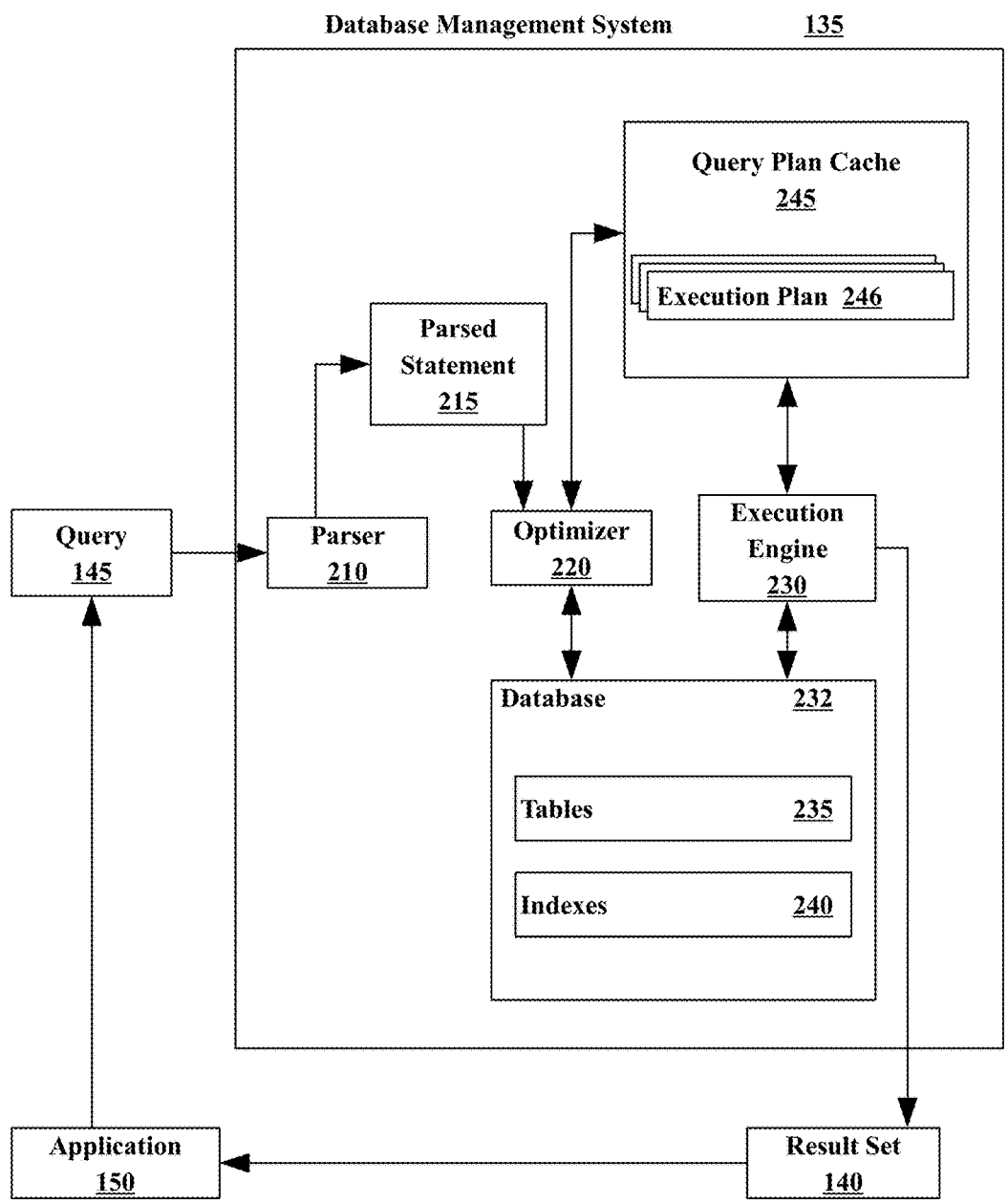
FIG. 2 illustrates an example database management system (DBMS) according to embodiments.

FIG. 2 illustrates an example database management system (DBMS) 135. The DBMS 135 may include a parser 210, an optimizer 220, an execution engine 230, and a database 232. The parser 210 may receive a database query 145 from an application 150. In some embodiments, the database query 145 may be in the form of a Structured Query Language (SQL) statement. The parser 210 may generate a parsed statement 215. The parser 210 may send the parsed statement 215 to an optimizer 220. The optimizer 220 may attempt to optimize the parsed statement. In some embodiments, optimizing may improve the performance of the database query 145 by, for example, reducing the amount of time it takes to provide a user with a response. The optimizer 220 may generate an execution plan 246 (access plan), which may be maintained in a query plan cache 245, according to some embodiments. The query plan cache 245 may include one or more execution plans 246, including the current execution plan as well as previously used execution plans. Once an execution plan 246 is generated, the execution plan 246 may be sent to the execution engine 230. The execution engine 230 may execute the query 145. Executing the query 145 may include finding and retrieving data in the database tables 235 that satisfies the criteria supplied in the query 145. The execution engine 230 may store the data returned matching the query 145 in a result set 140. The DBMS 135 may return the result set 140 to an application 150, such as the application in which the database query 145 was generated, as a response to the database query 145.

A database 232 may include one or more tables 235 and, in some embodiments, one or more indexes 240. A database table 235 may organize data into rows and columns. Each row of a database table 235 may correspond to an individual entry, a tuple, or a record in the database 232. A column may define what is stored in each entry, tuple, or record. In some embodiments, columns of a table 235 may also be referred to as fields or attributes. Each table 235 within the database 232 may have a unique name. Each column within a table 235 may also have a unique name. A row, tuple, or record, however, within a particular table 235 may not be unique, according to some embodiments. A database 232 may also include one or more indexes 240. An index 240 may be a data structure that may inform the DBMS 135 of the location of a particular record within a table 235 if given a particular indexed column value. In some embodiments, the execution engine 230 may use the one or more indexes 240 to locate data within a table 235. In other embodiments, the execution engine 230 may scan the tables 235 without using an index 240.

As mentioned herein, the optimizer 220 creates the query access plan. The optimizer 220 may be implemented as computer program instructions that optimize the access plan in dependence upon database management statistics. Database statistics may reveal, for example, that there are only two identification values in a transactions table—so that it is an optimization, that is, more efficient, to scan the transactions table rather than using an index. Alternatively, database statistics may reveal that there are many transaction records with only a few transaction records for each identification value—so that it is an optimization, that is, more efficient, to access the transaction records by an index.

Figure 3:
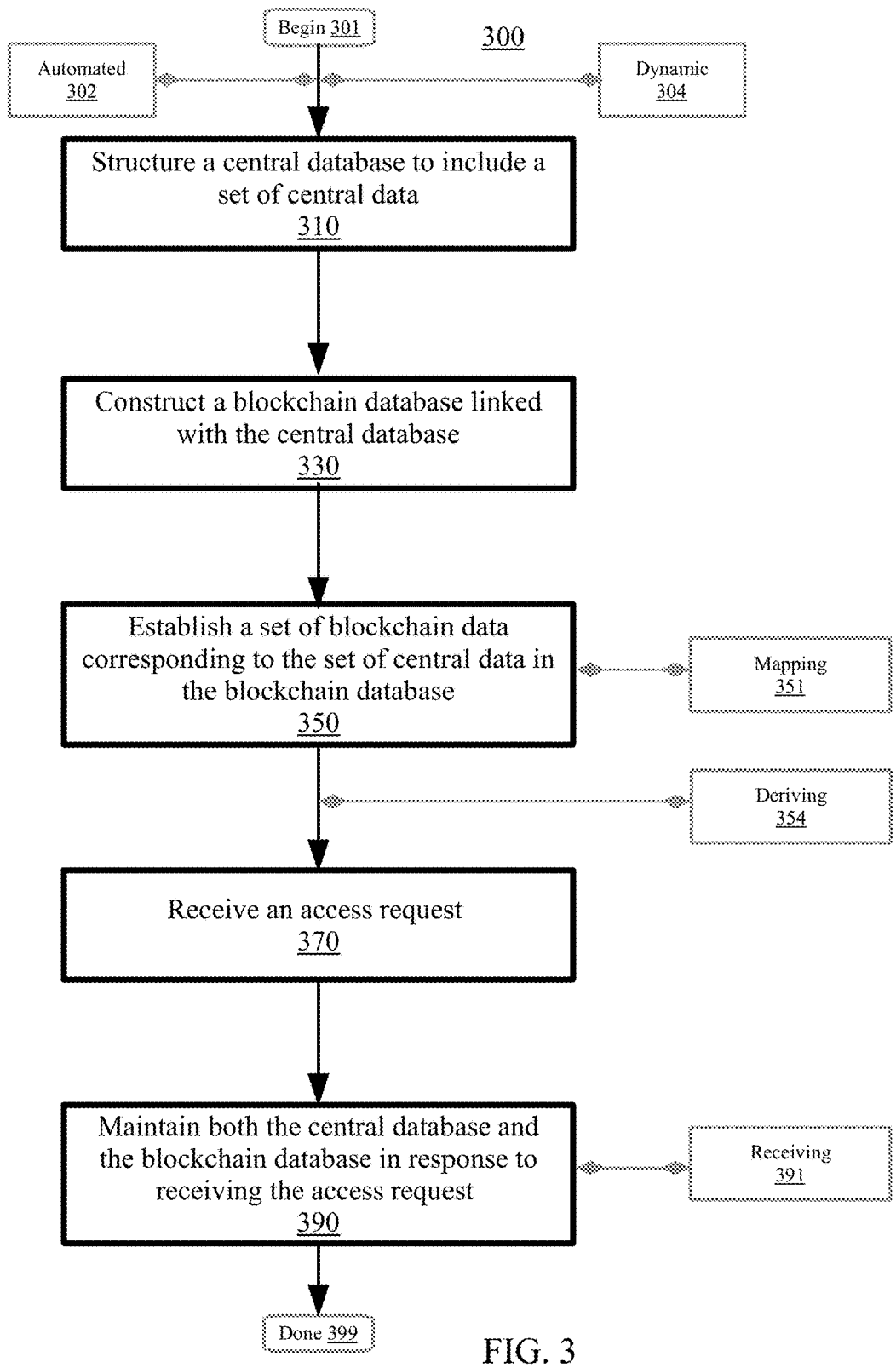
FIG. 3 is a flowchart illustrating a method for managing a database management system (DBMS), according to embodiments.

FIG. 3 is a flowchart illustrating a method 300 for managing a database management system (DBMS), according to embodiments. Aspects of FIG. 3 relate to constructing a blockchain database which is linked with a central database, and maintaining both the central database and the blockchain database to facilitate data security (e.g., to detect database tampering or unauthorized access). Aspects of the disclosure relate to the recognition that, in some situations, the control of access and modification permissions for data in a database may rest in the hands of a few individuals (e.g., database administrators), such that unauthorized (e.g., fraudulent) changes made by those individuals may go undetected. Accordingly, aspects of the disclosure relate to utilizing a blockchain database to provide an incorruptible database tampering detection system (IDT-DS) to detect tampering with respect to a set of data stored in a central database linked with the blockchain database. As such, inconsistencies between the central database and the blockchain database may be identified to provide a notification of potentially unauthorized/fraudulent activity. Altogether, leveraging a blockchain with respect to a DBMS may be associated with benefits including data security and integrity, data management flexibility, and database performance and efficiency. The method 300 may begin at block 301.

In embodiments, the structuring, the constructing, the establishing, the receiving, the maintaining, and the other steps described herein may each be executed in an automated fashion at block 302. The steps described herein may be executed in an automatic fashion without user intervention. In embodiments, the structuring, the constructing, the establishing, the receiving, the maintaining, and the other steps described herein may be carried out by an internal DBMS management module maintained in a persistent storage device of a local computing device (e.g., network node). In embodiments, the structuring, the constructing, the establishing, the receiving, the maintaining, and the other steps described herein may be carried out by an external DBMS management module hosted by a remote computing device or server (e.g., server accessible via a subscription, usage-based, or other service model). In this way, aspects of DBMS management may be performed using automated computing machinery without manual action. Other methods of performing the steps described herein are also possible.

In embodiments, the collecting, the determining, the performing, and the other steps described herein may each be executed in a dynamic fashion at block 304. The steps described herein may be executed in a dynamic fashion to streamline management of the DBMS using the blockchain database. For instance, the structuring, the constructing, the establishing, the receiving, the maintaining, and the other steps described herein may occur in real-time, ongoing, or on-the-fly. As an example, one or more steps described herein may be performed on-the-fly (e.g., both the central database and the blockchain database may be maintained simultaneously in response to receiving the access request) in order to streamline (e.g., facilitate, promote, enhance) management of the DBMS. Other methods of performing the steps described herein are also possible.

At block 310, a central database may be structured to include a set of central data with respect to the DBMS. Generally, structuring can include assembling, organizing, arranging, formatting, or otherwise configuring the central database to include the set of central data with respect to the DBMS. The central database may include an organized collection of structured or unstructured data. The central database may include a collection of schemas, tables, queries, indices, reports, views, and other data structures that are configured to facilitate the storage, organization, retrieval, security, and management of data. As examples, the central database may include relational databases, cloud databases, deductive databases, distributed databases, operational databases, parallel databases, or other types or combinations of databases. For instance, the central database may include an SQL (Structured Query Language) based data warehouse used by a bank to record and monitor financial transactions. In embodiments, the central database may include a set of central data. The set of central data may include a collection of formatted information that is configured to be maintained by the central database. As an example, the set of central data may include a list that defines a source account, destination account, and currency amount for one or more financial transactions. In embodiments, the central database may be structured to include the set of central data. Structuring may include configuring the central database to achieve one or more hosting criteria (e.g., requirements, stipulations, or guidelines necessary to host the set of central data in the central database) of the set of central data. For instance, structuring may include partitioning the central database to generate a designated partition for storage of the set of central data, performing a database operation to format the central database to store the set of central data, implementing a security protocol to accommodate a specified security level of the set of central data, or the like. Other methods of structuring the central database to include the set of central data with respect to the DBMS are also possible.

At block 330, a blockchain database may be constructed with respect to the DBMS. The blockchain database may be linked with the central database. Generally, constructing can include assembling, building, organizing, creating, arranging, or otherwise establishing the blockchain database with respect to the DBMS. The blockchain database may include a distributed database configured to maintain a list of ordered records in units of discrete blocks. Each block of the blockchain database may include a timestamp and a hash value corresponding to one or more previous blocks in the blockchain database (e.g., such that the data in a block may not be altered retroactively). In embodiments, the blockchain database may be linked with the central database. For instance, the blockchain database and the central database may be configured to be communicatively connected to one another to facilitate data sharing. As another example, the blockchain database and the central database may be synchronized with one another such that modifications or updates made with respect to the central database are automatically performed with respect to the blockchain database as well (and vice versa). In embodiments, constructing may include establishing the blockchain database in a distributed cloud computing environment such that the blockchain database is configured to receive data from the central database. Consider the following example. A bank may maintain a central database of financial transactions (e.g., set of central data) on a local network having a set of physical servers. In embodiments, constructing may include configuring a group of remotely located (e.g., distributed, decentralized) blockchain database nodes to access the central database of the bank such that data may be securely transferred between the central database and the group of remote blockchain database nodes. Other methods of constructing the blockchain database with respect to the DBMS are also possible.

At block 350, a set of blockchain data corresponding to the set of central data of the central database may be established in the blockchain database. Generally, establishing can include storing, sending, saving, introducing, or otherwise instantiating the set of blockchain data in the blockchain database. The set of blockchain data may include a subset (e.g., partial copy) of the set of central data maintained in the central database. In embodiments, the set of blockchain data may include a hash of the subset of the set of central data. For instance, the set of blockchain data may include a designated subset of rows and columns from the set of central data, segments of data from individual data cells of the set of central data, the data from particular data tables or indices, or other type of data structure encrypted as a hash. In embodiments, the set of blockchain data may include a subset of designated properties, characteristics, or data fields of the set of central data. As an example, consider a set of central data that includes account balances, names, account numbers, and financial transaction records for a plurality of bank accounts. In embodiments, the set of blockchain data may include the financial transaction records (e.g., source account, destination account, and transferred currency amount) but not include the account balances or names of the bank accounts. In embodiments, establishing the set of blockchain data in the blockchain database may include replicating, migrating, or otherwise transferring a portion of the set of central data from the central database to the blockchain database. For instance, establishing may include importing a subset of the set of central data from the central database and formatting it as a set of individual blocks for storage in the blockchain database. As an example, each financial transaction of the set of central data may be represented in the blockchain database as a distinct block having a unique hash value computed based on the time, date, transfer amount, source account, and destination account of the transaction. Each block may include a flag, tag, annotation, marker, or other identifier that indicates the individual portion (e.g., data cell, row and column, financial transaction entry) of the set of central data to which the block corresponds. Other methods of establishing the set of blockchain data in the blockchain database are also possible.

In embodiments, a first central entry of the central database may be mapped to a first blockchain entry of the blockchain database to establish the set of blockchain data at block 351. Generally, mapping can include linking, correlating, matching, corresponding, assigning, or otherwise associating the first central entry of the central database with the first blockchain entry of the blockchain database. The first central entry of the central database may include a particular data cell, row, column, index, data table, partition, record, or other data structure of the central database. The first blockchain entry may include a block or series of connected blocks (e.g., blockchain) of the blockchain database. In embodiments, mapping may include copying a partition, table, index, group of rows, columns, group of data cells, or other type of first central entry from the set of central data to a corresponding data structure of the blockchain database. As an example, a data table included in the set of central data may have a collection of 8 rows. Accordingly, in certain embodiments, mapping may include replicating the data stored in each row of the data table to a separate block to form a first blockchain entry (e.g., blockchain structure) within the blockchain database that corresponds to the data table. In embodiments, mapping may include assigning a pair of linkage identifiers to both the data table in the central database and the blockchain structure of the blockchain database to indicate the correspondence between the data maintained in the first central entry and the first blockchain entry. Other methods of mapping the first central entry of the central database to the first blockchain entry of the blockchain database are also possible.

In embodiments, a set of blockchain data may be derived from the set of central data at block 354. The set of blockchain data may include a subset of the set of central data. Generally, deriving can include formulating, identifying, extracting, composing, generating, or otherwise creating the set of blockchain data from the set of central data. In embodiments, deriving the set of blockchain data from the set of central data may include utilizing a hash function to generate a hash value that corresponds to the set of central data. The hash value may include a sequence of numbers and letters that represents a unique identifier for the set of central data. As an example, consider a first set of central data including the following information "Source Account User: Jane; Destination Account User: Robert; Transfer Amount: $1000; Transfer Date: Nov. 14, 2016; Transfer Time: 3:11:54 PM." One or more of a number of hash functions may be used to parse the source account user, destination account user, transfer amount, transfer date, transfer time, and other information of the first set of central data to generate a unique hash value corresponding to the first set of central data. As an example, a hash function may generate a hash value of "4a30de5782xp4k93j0el09f615i1f9" for the first set of central data. Accordingly, the hash function generated for the first set of central data may be maintained in a first block within the blockchain database. The first block may be connected with one or more other blocks in the blockchain database (e.g., blocks corresponding to other financial transactions of the same source account user/destination account user). Other methods of deriving the set of blockchain data from the set of central data are also possible.

At block 370, an access request may be received with respect to the DBMS. Generally, receiving can include detecting, collecting, sensing, discovering, recognizing, obtaining, or otherwise accepting delivery of the access request. The access request may include a query for data stored in the DBMS, an application for permission to access (e.g., perform read or write operations on) the DBMS, or a notification of an update with respect to data stored in the DBMS. For instance, the access request may indicate an updated or revised value for one or more data cells, columns, or rows of the DBMS. As examples, the access request may include a financial transaction, an update to the medical records of a patient, a modified sale price for a product, or a revised stock price for a particular stock. In embodiments, receiving the access request may include sensing delivery of a new set of data with respect to the DBMS, and parsing the new set of data to identify the nature (e.g., sender, requested data, designated data to update) of the access request. As an example, for a DBMS configured to maintain a set of central data related to the stock prices of various companies, an access request to update the share price of one or more companies may be received by the DBMS after the close of trading for a particular day. Other methods of receiving the access request with respect to the DBMS are also possible.

At block 390, both the central database and the blockchain database may be maintained in response to receiving the access request. Generally, maintaining can include modifying, up-keeping, retaining, revising, sustaining, or otherwise managing both the central database and the blockchain database. In embodiments, maintaining the central database and the blockchain database may include updating both the set of blockchain data stored in the blockchain database and the set of central data stored in the central database in response to receiving the access request. As an example, with reference to the previous example, in response to receiving an access request to revise the share price of Company A from "$8.16" to "$9.32," a database management module of the DBMS may be configured to update the share price of Company A in both the central database and the blockchain database (e.g., simultaneously, in a dynamic fashion). In certain embodiments, maintaining may include first updating the set of central data in the central database as directed by the access request, and subsequently instructing the blockchain database to query the central database to retrieve the updated set of central data. In embodiments, maintaining may include using the database management module of the DBMS to periodically (e.g., once per day, once per hour, after each transaction, after 10 transactions) to periodically synchronize the central database and the blockchain database. Accordingly, the blockchain database may be configured to import updated data from the central database, format it as a block, and store it within the blockchain database. Other methods of managing both the central database and the blockchain database are also possible.

In embodiments, a valid user authorization to carry-out the access request may be received with respect to the blockchain database at block 391. The valid user authorization may be associated with the access request. Generally, receiving can include detecting, collecting, sensing, discovering, recognizing, obtaining, or otherwise accepting delivery of the valid user authorization to carry-out the access request. The valid user authorization may include a permission, allowance, verification, or other authentication to indicate that a particular user has approved of the access request. The valid user authorization may be received from a user designated as the owner, primary account holder, administrator, or other authorized individual with respect to the set of central data/set of blockchain data. In embodiments, the valid user authorization may be required by the blockchain database before the access request may be carried-out (e.g., performed, executed, implemented) with respect to the blockchain database. As an example, consider a set of central data/set of blockchain data corresponding to the medical records for a first user. The DBMS may receive an access request to transfer the medical records of the first user from a first medical institution (e.g., hospital, clinic) to a second medical institution. The access request may be associated with a valid user authorization that requests the approval of a user before the medical records may be transferred. Accordingly, in embodiments, the first user may indicate approval (e.g., or disapproval) of the access request (e.g., via entering a password into a dialogue box prompt), and the access request may be carried-out to transfer the medical records from the first medical institution to the second medical-institution. In embodiments, the valid user authorization may be implemented using one or more of a smart contract, public key cryptography, private key cryptography, or other authentication technique. Other methods of receiving the valid user authorization to carry-out the access request are also possible.

Consider the following example. A central database managed by a bank may be structured to include a set of central data related to financial transactions for a group of users (e.g., bank customers or clients). The set of central data may include information regarding the account balances, names, account numbers, and financial transaction records for a plurality of bank accounts of the group of users. As described herein, a blockchain database that is linked (e.g., communicatively connected) with the central database may be constructed, and a set of blockchain data corresponding to the set of central data may be established in the blockchain database. For instance, the blockchain database may be configured to import a subset of the set of central data corresponding to the financial transaction records for each bank account, and utilize a hash function to generate a unique hash value for each individual financial transaction record. The hash values for each financial transaction may be stored in separate blocks linked together in a blockchain (e.g., such that all the financial transactions for a single bank account are represented as individual blocks in the same blockchain). The DBMS may receive an access request relating to transferring a currency amount from a first account to a second account. The access request may be associated with a valid user authorization. For instance, the valid user authorization may include a password received by an owner of the first account to indicate approval to transfer the currency amount from the first account to the second account. In response to verification of the valid user authorization, the access request may be performed. For instance, the transfer of the currency amount from the first account to the second account may be carried-out. In embodiments, in response to performance of the access request, both the central database and the blockchain database may be maintained. As an example, both the central database and the blockchain database may be updated to indicate the revised account balances for the first and second accounts subsequent to the currency transfer. Other methods of managing the database management system using the blockchain database are also possible.

Method 300 concludes at block 399. Aspects of method 300 may provide performance or efficiency benefits for managing a DBMS using a blockchain database. As an example, blockchain databases may be used to maintain a secure copy of data stored in a central database, such that unauthorized changes to the central database may be detected (e.g., to prevent tampering with database data by database administrators or other authorized users). Additionally, utilization of a blockchain database may be associated with database management flexibility, as institutions (e.g., companies, organizations) may retain existing database systems in addition to the blockchain database. Altogether, leveraging a blockchain with respect to a DBMS may be associated with benefits including data security and integrity, ease of implementation, and database performance and efficiency.

Figure 4:
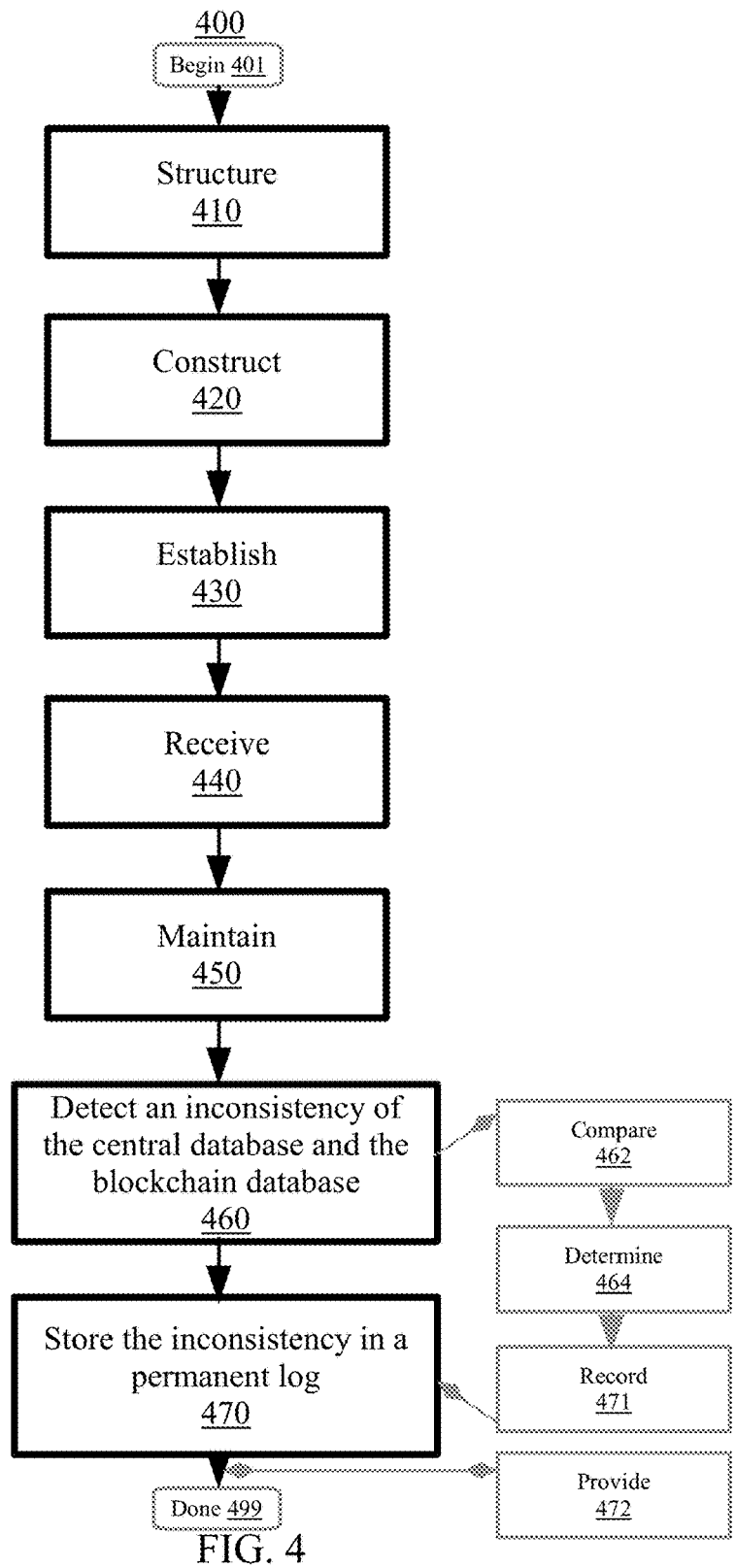
FIG. 4 is a flowchart illustrating a method for managing a database management system (DBMS), according to embodiments.

FIG. 4 is a flowchart illustrating a method 400 for managing a database management system (DBMS), according to embodiments. Aspects of method 400 relate to detecting an inconsistency of a central database and the blockchain database, and storing the inconsistency in a permanent log. Aspects of method 400 may be similar or the same as aspects of method 300, and aspects may be utilized interchangeably with one or more methodologies described herein. The method 400 may begin at block 401. At block 410, a central database may be structured to include a set of central data with respect to the DBMS. At block 420, a blockchain database which is linked with the central database may be constructed with respect to the DBMS. At block 430, a set of blockchain data may be established in the blockchain database corresponding to the set of central data of the central database. At block 440, an access request may be received with respect to the DBMS. At block 450, both the central database and the blockchain database may be maintained in response to receiving the access request.

In embodiments, an inconsistency of the central database and the blockchain database may be detected at block 460. Generally, detecting can include sensing, recognizing, discovering, identifying, or otherwise ascertaining the inconsistency of the central database and the blockchain database. Aspects of the disclosure relate to the recognition that, in some situations, inconsistencies may arise between the central database and the blockchain database. The inconsistencies may include discrepancies, deviations, inequalities, divergences, incongruities, or other disparities or differences between the set of central data and the set of blockchain data. Such inconsistencies may be the result of a database operation error, communication error between the central database and the blockchain database, potential unauthorized modification (e.g., tampering) of the central database, or the like. Accordingly, aspects of the disclosure relate to detecting inconsistencies between the central database and the blockchain database to maintain the security and integrity of stored data. In embodiments, detecting the inconsistency of the central database and the blockchain database may include using a database management module to monitor the central database and the blockchain database in order to identify when a particular data object (e.g., data cell, row, column, entry) does not match between the central database and the blockchain database. As an example, detecting the inconsistency may include ascertaining that one or more values stored in data cells of the central database do not match the values of the corresponding blocks of the blockchain database. Other methods of detecting the inconsistency of the central database and the blockchain database are also possible.

In embodiments, the set of central data of the central database may be compared with the set of blockchain data of the blockchain database to detect the inconsistency at block 462. Generally, comparing can include contrasting, investigating, juxtaposing, correlating, or otherwise evaluating the set of central data of the central database with the set of blockchain data of the blockchain database. In embodiments, comparing may include examining the set of central data with respect to the set of blockchain data. For instance, in certain embodiments, a database management module may be configured to select a data structure (e.g., set of data cells, rows, columns, tables, indices) of the central database, ascertain a linkage identifier associated with the selected data structure that designates a corresponding block or series of blocks within the set of blockchain data, parse the hash value indicated by the designated block or series of blocks to decipher (e.g., decode, decrypt) the stored data, and subsequently analyze the stored data from the block of the blockchain database with respect to the selected data structure of the central database to determine whether the set of central data and the set of blockchain data are equal/equivalent. Other methods of comparing the set of central data of the central database with the set of blockchain data of the blockchain database are also possible.

In embodiments, a mismatch of a first central entry of the central database and a first blockchain entry of the blockchain database may be determined at block 464. Generally, determining can include resolving, computing, formulating, calculating, identifying, or otherwise ascertaining the mismatch of the first central entry of the central database and the first blockchain entry of the blockchain database. The mismatch may include a discrepancy between a central entry of the central database and a blockchain entry of the blockchain database that fails to achieve a threshold similarity factor (e.g., benchmark, norm, or criterion that defines a required or desirable degree of agreement or consistency). In embodiments, determining the mismatch may include computing the magnitude of the discrepancy between the first central entry and the first blockchain entry, and evaluating the magnitude of the discrepancy with respect to the threshold similarity factor. Consider the following example. A first central entry of the central database may include a data cell that indicates a currency transfer amount of "$1800," and a first blockchain entry of the blockchain database may indicate a currency transfer amount of "$1400." The first central entry and the first blockchain entry may be analyzed to compute a magnitude for the discrepancy of "$400." As described herein, the computed magnitude may be compared to a threshold similarity factor that indicates a tolerable discrepancy of no more than 1% of the first blockchain entry (e.g., $14). As the magnitude of the discrepancy fails to achieve the threshold similarity factor (e.g., a discrepancy of $1400 does not satisfy the threshold of $14), the discrepancy between the first central entry and the first blockchain entry may be determined to be a mismatch. Other methods of determining the mismatch of the central database and the first blockchain entry are also possible.

In embodiments, the inconsistency may be stored in a permanent log at block 470. Generally, storing can include saving, logging, documenting, archiving, reporting, or otherwise recording the inconsistency in the permanent log. The permanent log may include a data store, database partition, or designated memory location that is configured to maintain a persistent (e.g., enduring, imperishable) history of the inconsistencies detected between the central database and the blockchain database. The permanent log may be configured such that saved data is prevented from subsequent modifications or edits. For instance, the permanent log may be formatted according to a write-once read-many (WORM) data storage protocol (e.g., such that written data cannot be modified). In embodiments, storing the inconsistency may include creating a new data entry in the permanent log that indicates information regarding the time and date the inconsistency was discovered (e.g., Feb. 8, 2016 at 9:04:58 PM), the magnitude of the discrepancy (e.g., 15% deviation between the central entry and the blockchain entry), one or more recent users (e.g., individuals who modified, edited, or accessed the central database within a threshold time interval), the last login time of an account holder, or the like. In embodiments, storing the inconsistency in the permanent log may include recording the mismatch of the first central entry of the central database and the first blockchain entry of the blockchain database in a blockchain permanent log at block 471. Generally, recording can include documenting, saving, logging, archiving, copying, filing, cataloging, or chronicling the mismatch of the first central entry and the first blockchain entry. The blockchain permanent log may include a data store maintained within or together with the blockchain database (e.g., the same physical data store as the blockchain database). In embodiments, recording may include using a hash function to encode the information related to the inconsistency as a hash value, and storing the hash value together with the block in the blockchain that corresponds to the data associated with the inconsistency. Other methods of storing the inconsistency in a permanent log and recording the mismatch in the blockchain permanent log are also possible.

In embodiments, aspects of the disclosure relate to the recognition that a separate copy of the blockchain database may be maintained on a plurality of distributed compute nodes within a cloud computing environment. Accordingly, in certain embodiments, detecting the inconsistency between the set of central data and the set of blockchain data may include polling the plurality of distributed compute nodes to ascertain whether the inconsistency is present among other copies of the set of blockchain data. For instance, each distributed compute node of the plurality of distributed compute nodes may submit a vote as to whether the value indicated by the set of central data or the value indicated by the set of blockchain data is correct. The set of votes of the plurality of distributed compute nodes may be collected and counted by the DBMS. In response to calculating that a majority (e.g., 50%+1) of the distributed compute nodes voted that the value indicated by the set of blockchain data is correct, the inconsistency may be logged (e.g., in a permanent log). In response to calculating that a majority of the distributed compute nodes voted that the value indicated by the set of central data is correct, the inconsistency may be disregarded (e.g., ignored, discarded). Other methods of detecting the inconsistency are also possible.

In embodiments, an alert of the inconsistency may be provided in response to detecting the inconsistency at block 472. Generally, providing can include displaying, conveying, transmitting, relaying, or otherwise presenting an alert of the inconsistency in response to detecting the inconsistency. The alert of the inconsistency may include a warning, message, alarm, announcement, communication, or other notification of the inconsistency. In embodiments, providing the alert of the inconsistency may include transmitting an electronic message to a specified address (e.g., email address, phone number, account mailbox) of a user. For instance, in a situation in which an inconsistency is detected with respect to a set of medical records of a patient, an email may be transmitted to an email address of the patient to inform them of the inconsistency (e.g., potentially indicating unauthorized access to or modification of the medical records). As another example, in a situation in which an inconsistency is detected with respect to a set of financial transactions of a bank account holder, a text message may be sent to the registered phone number of the bank account holder to inform them of the irregularity with respect to the set of financial transactions (e.g., potentially indicating tampering or unauthorized usage of the bank account). In embodiments, providing may include transmitting a notification of the inconsistency to one or more distributed computing nodes that host the blockchain database, and surveying them to ascertain whether the inconsistency is present among other copies (e.g., versions, iterations) of the blockchain. Other methods of providing the alert of the inconsistency are also possible. Method 400 concludes at block 499. Aspects of method 499 may provide performance or efficiency benefits for managing a database management system (e.g., data security and integrity, data management flexibility, and database performance and efficiency).

Figure 5:
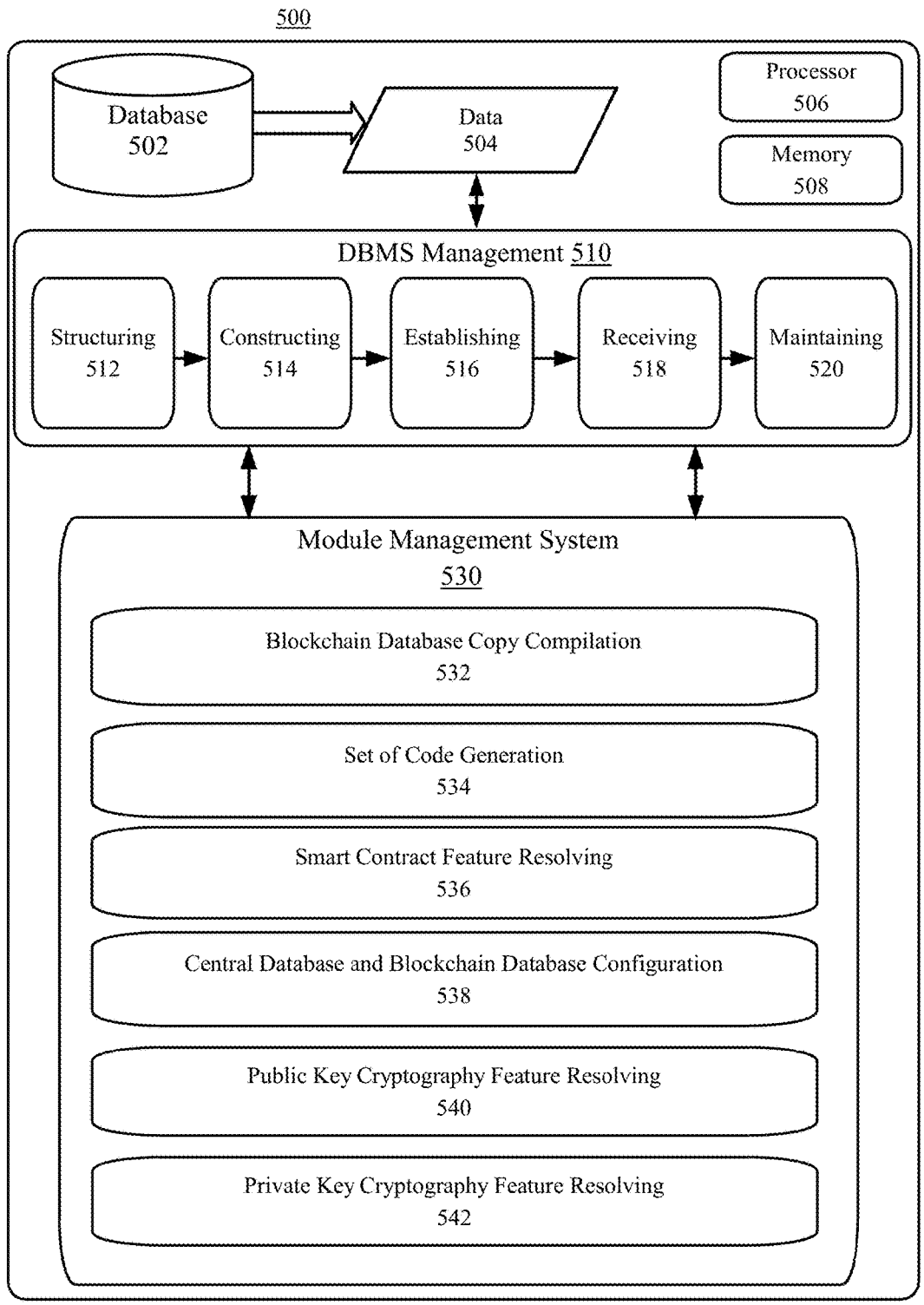
FIG. 5 shows an example system for managing a database management system (DBMS), according to embodiments.

FIG. 5 shows an example system 500 for managing a database management system (DBMS), according to embodiments. Aspects of FIG. 5 relate to utilizing a blockchain database to manage a DBMS. The example system 500 may include a processor 506 and a memory 508 to facilitate implementation of DBMS management. The example system 500 may include a database 502 (e.g., central database, blockchain database) configured to maintain data related to DBMS management. In embodiments, the example system 500 may include a DBMS management system 510. The DBMS management system 510 may be communicatively connected to the database 502, and be configured to receive data 504 (e.g., set of central data, set of blockchain data) related to DBMS management. The DBMS management system 510 may include a structuring module 512 configured to structure a central database to include a set of central data, a constructing module 514 configured to construct a blockchain database linked with the central database, an establishing module 516 configured to establish a set of blockchain data in the blockchain database corresponding to the set of central data of the central database, a receiving module 518 configured to receive an access request, and a maintaining module 520 configured to maintain both the central database and the blockchain database in response to receiving the access request. The operational steps described herein may be performed dynamically (e.g., in real-time, ongoing, on-the-fly) to streamline operating system update management. The DBMS management system 510 may be communicatively connected with a module management system 530 that includes one or more modules for implementing aspects of DBMS management.

In embodiments, a set of blockchain database copies may be compiled for a set of consumer users at module 532. The set of blockchain database copies may be compiled to manage the blockchain database. Generally, compiling can include creating, assembling, aggregating, establishing, or otherwise generating the set of blockchain database copies. Aspects of the disclosure relate to the recognition that configuring a group of host compute nodes of a distributed cloud computing environment to each maintain a separate copy of the blockchain database and the blockchain permanent log may be associated with data security, fidelity, and integrity. Accordingly, aspects of the disclosure relate to leveraging the blockchain to maintain a plurality of copies of the blockchain database on multiple computers of a distributed cloud computing environment. The set of blockchain database copies may include duplicates, reproductions, replications, or other versions or iterations of the blockchain database that achieve a similarity threshold with respect to an original blockchain database. In embodiments, the set of blockchain database copies may be identical with respect to the original blockchain database. In certain embodiments, each copy of the set of blockchain database copies may be configured to be accessed by one or more consumer users (e.g., clients, account holders). Compiling the set of blockchain database copies may include generating a separate version of the blockchain database for each host computing node of the distributed cloud computing environment, and allocating a copy of the set of blockchain database copies to each computing node. For instance, each host computing node of the distributed cloud computing environment may maintain an identical copy of each block of the set of blockchain database. As such, in the event that an inconsistency is detected with respect to the blockchain database and the central database, the DBMS may be configured to access one or more copies of the blockchain database to verify the validity of the set of central data in the central database. Other methods of compiling a set of blockchain database copies for a set of consumer users are also possible.

In embodiments, a set of code to interact with the blockchain database may be generated at module 534. The set of code to interact with the blockchain database may be generated in an application program. Generally, generating can include creating, producing, instantiating, developing, initiating, configuring, or otherwise establishing the set of code to interact with the blockchain database. The set of code may include a collection of computer instructions for governing communication between the blockchain database and other databases and computer nodes (e.g., the central database). In embodiments, the set of code may define the security protocols, data encryption, source and destination addresses for use by the central database to transfer or access data (e.g., the set of blockchain data) with respect to the blockchain database. In embodiments, generating the set of code may include developing a series of scripts for use by one or more application programs (e.g., multimedia applications, database applications, enterprise infrastructure software, web applications) in order to access the blockchain database. As an example, generating the set of code may include developing a JavaScript (trademark of Oracle Corporation) script for insertion in a web-based software application to facilitate modification and data migration of the blockchain database by the web application. As such, the web application may utilize the script to access the blockchain database to compare data, verify transactions, backup data, and the like. Other methods of generating the set of code to interact with the blockchain database are also possible.

In embodiments, a smart contract feature may be resolved to carry-out the access request with respect to the blockchain database at module 536. The smart contract feature may be resolved in association with the access request. Generally, resolving can include instantiating, formulating, generating, calculating, instituting, identifying, implementing, establishing, or otherwise determining the smart contract feature to carry-out the access request with respect to the blockchain database. The smart-contract feature (e.g., also referred to as a self-executing contract, blockchain contract, or digital contract) may include a computer program configured to facilitate, execute, and enforce performance of an agreement using the blockchain database. The smart contract feature may designate the rules, conditions, stipulations, and consequences of an agreement or interaction configured for execution within the blockchain. For instance, the smart-contract may include a computer program preprogrammed based on the access request and configured to verify that database operations with respect to the central database and the blockchain database are performed in compliance with the access request. In embodiments, resolving may include configuring a distributed ledger system to implement the smart contract feature within the blockchain database. Consider the following example. An access request may include instructions defining a rule that only three data transactions (e.g., funds transfers) per week are allowed with respect to a subset of the set of central data, and that violation of this instruction initiates transmission of a warning notification to a plurality of users. Accordingly, the smart contract feature may monitor the data transaction frequency with respect to the subset of the set of central data in order to verify that the number of data transactions does not exceed the limit defined by the access request. In certain embodiments, in response to detecting a data transaction that exceeds the defined limit of three data transactions per week (e.g., a fourth data transaction), the smart contract may be configured to automatically enforce the access request by blocking the data transaction and transmitting the warning notification to the plurality of users. Other methods of resolving the smart contract feature to carry-out the access request are also possible.

In embodiments, the accessibility of the central database and the blockchain database may be configured at module 538. Generally, configuring can include setting up, arranging, modifying, regulating, governing, handling, or otherwise managing the accessibility of the central database and the blockchain database. In embodiments, the central database may be configured for accessibility by a set of administrator users. The set of administrator users may include one or more individuals who are authorized (e.g., trusted) with control, authority, or responsibility with respect to one or more aspects of the central database. In embodiments, configuring the central database for accessibility by the set of administrator users may include modifying a set of access permissions to allow the set of administrator users to perform read operations or write operations with respect to the set of central data (e.g., or a subset of the set of central data). For instance, the set of access permissions may be modified to allow the set of administrator users to read and copy data within one or more data tables or indices, manually update the values stored in particular data structures, initiate data transfers between the central database and the blockchain database, and the like. In embodiments, the central database may be configured for inaccessibility by a set of non-administrator users. The set of non-administrator users may include individuals who are not authorized with administrative privileges with respect to the central database. For example, the set of non-administrator users may include consumers, clients, account holders, or other individuals who utilize one or more services provided by the central database. In embodiments, configuring the central database for inaccessibility by the set of non-administrator users may include modifying the set of access permissions to prevent (e.g., deny, disallow, limit, restrict) the set of non-administrator users from performing one or more types of operations with respect to the set of central data. As an example, the set of non-administrator users may be authorized for read-only access to a subset of the set of central data (e.g., data related to an account that they own), and restricted from performing write operations with respect to the set of central data (e.g., to maintain data integrity and security).

In embodiments, the blockchain database may be configured for inaccessibility by the set of administrator users. As described herein, aspects of the disclosure relate to the recognition that in some situations, entrusting sole control of the central database to the set of administrator users may be associated with challenges with respect to data security (e.g., modification or tampering by administrator users may go undetected). Accordingly, aspects of the disclosure relate to maintaining the blockchain database independently of administrator user control to facilitate data security. In embodiments, configuring the blockchain database for inaccessibility by the set of administrator users may include preventing the set of administrator users from performing write-operations with respect to the blockchain database. In certain embodiments, configuring the blockchain database for inaccessibility by the set of administrator users may disallowing the set of administrator users from initiating data transfers between the central database and the blockchain database. In embodiments, the blockchain database may be configured for accessibility via a smart contract. As described herein, aspects of the disclosure relate to utilizing a smart contract to manage access to one or more portions of the set of blockchain data. In embodiments, configuring the blockchain database for accessibility may include structuring (e.g., composing, developing, programming) the smart contract to permit limited access to a subset of the set of blockchain data by the set of non-administrator users. For instance, the smart contract may specify a list of individuals (e.g., account holders, account owners) that are authorized to approve or deny changes with respect to a particular subset of the set of blockchain data stored in the blockchain database (e.g., changes made with respect to the account or account data of the specified individuals). As an example, a non-administrator user including a bank account holder may be authorized to confirm or deny transmission or reception of funds with respect to his or her bank account. Other methods of configuring the accessibility of the central database and the blockchain database are also possible.

In embodiments, a public key cryptography feature may be resolved to carry-out the access request with respect to the blockchain database at module 540. Generally, resolving can include instantiating, formulating, generating, calculating, instituting, identifying, implementing, establishing, or otherwise determining the public key cryptography feature to carry-out the access request with respect to the blockchain database. The public key cryptography feature (e.g., also referred to as asymmetric cryptography) may include a cryptographic system that utilizes a pair of keys to authenticate and encrypt a portion of data. In embodiments, the public key cryptography feature may include a first key (e.g., public key widely known by multiple users) used to encrypt a portion of data, and a second key (e.g., private key known only to the recipient of the data) to decipher the encrypted portion of data. In embodiments, the public key cryptography feature may be used to verify the authenticity (e.g., veracity, credibility) of the access request. In embodiments, resolving the public key cryptography feature may include utilizing a first key (e.g., public key) of a first user (e.g., sender of the authentication request) to encrypt the access request, transmitting the encrypted access request to the blockchain database, and subsequently utilizing a second key (e.g., private key) to decrypt the access request and perform it with respect to the blockchain database. As an example, consider a situation in which a first user (e.g., account holder of a bank account managed by the blockchain database) submits an access request to initiate a funds transfer from his/her account to a destination account. The first user may use a public key of "041d8d9af5" to encrypt his or her access request, and transmit the access request to the blockchain database. Accordingly, the blockchain database may receive the access request, and use a designated second key (e.g., private key for the first user) of "0822c3c50e" to decode the access request and verify its authenticity, and subsequently initiate the funds transfer. Other methods of resolving the public key cryptography feature to carry-out the access request with respect to the blockchain database are also possible.

In embodiments, a private key cryptography feature may be resolved to carry-out the access request with respect to the blockchain database at module 542. Generally, resolving can include instantiating, formulating, generating, calculating, instituting, identifying, implementing, establishing, or otherwise determining the private key cryptography feature to carry-out the access request with respect to the blockchain database. The private key cryptography feature (e.g., also referred to as secret-key encryption or symmetric encryption) may include a cryptographic system that utilizes a single key for authentication and encryption of a portion of data. The key may include a secret or private key that is known only to a few users (e.g., the sender and recipient of the message). The private key cryptography feature may be used to verify the authenticity (e.g., veracity, credibility) of the access request. In embodiments, resolving the private key cryptography feature may include using the private key to encrypt the access request prior to transmission from a first user, transmitting the encrypted access request to the blockchain database, and subsequently utilizing the private key to decrypt the access request and perform it with respect to the blockchain database. As an example, consider a situation in which a first user (e.g., patient of a hospital) submits an access request to authorize transfer of his/her medical records from a first hospital to the second hospital. The first user may use a private key of "3014FO1BE9" to encrypt his or her access request, and transmit the access request to the blockchain database. Accordingly, the blockchain database may receive the access request, and use the same private key of "3014FO1BE9" to decode the access request, verify its authenticity, and subsequently initiate the transfer of the medical records from the first hospital to the second hospital. Other methods of resolving the private key cryptography feature to carry-out the access request with respect to the blockchain database are also possible.

Figure 6:
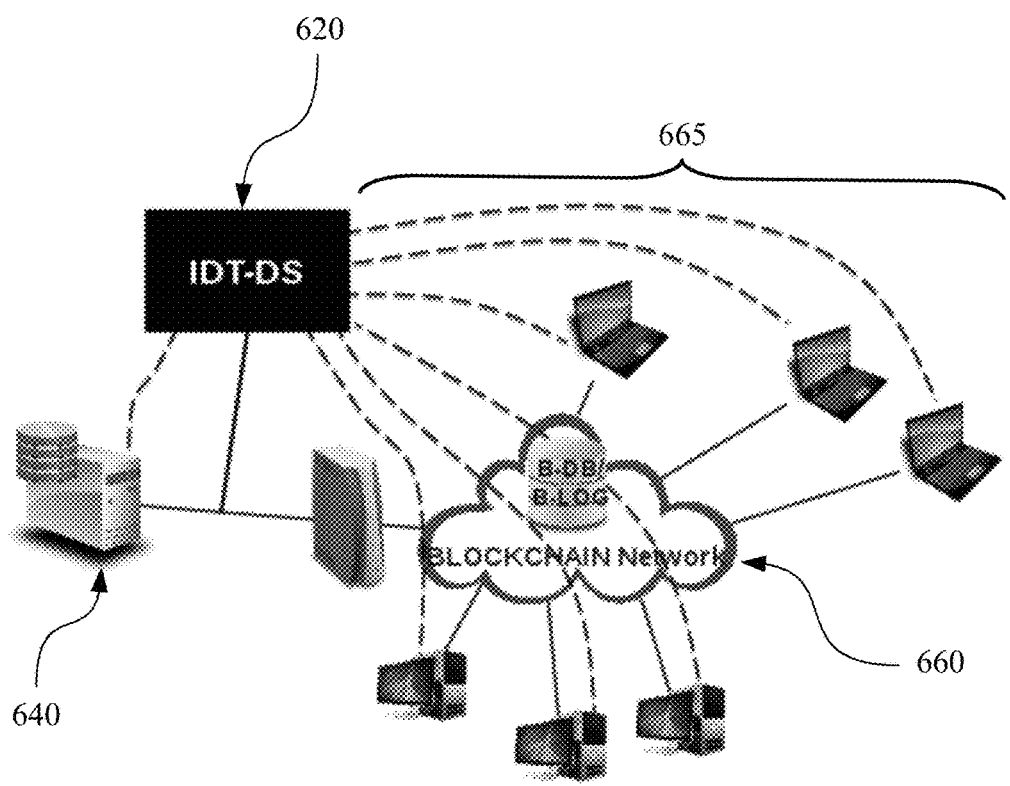
FIG. 6 illustrates an example network infrastructure for managing a database management system using a blockchain database, according to embodiments.

FIG. 6 illustrates an example network infrastructure 600 for managing a database management system using a blockchain database, according to embodiments. Aspects of the example network infrastructure 600 relate to using an incorruptible database tampering detection system (IDT-DS) 620 to monitor a central database 640 and a blockchain database 660 to detect inconsistencies (e.g., that may be indicative of unauthorized or fraudulent activity). As shown in FIG. 6, the example network infrastructure 600 may include a central database 640 that is communicatively connected to the blockchain database 660. The blockchain database 660 may include a plurality of distributed compute nodes 665 each configured to maintain a separate copy of a set of blockchain data. The set of blockchain data may include a subset of the set of central data stored on the central database 640 that is maintained in a blockchain (e.g., series of discrete, connected blocks associated with a hash).

In embodiments, the example network infrastructure 600 may include an IDT-DS 620 that is separate from both the central database 640 and the blockchain database 660. The central database 640 and the blockchain database 660 may be physically separate. The IDT-DS 620 may include a detection engine configured to monitor both the central database 640 and the blockchain database 660 to detect inconsistencies that may arise between the set of central data stored in the central database 640 and the blockchain database 660. For instance, the IDT-DS 620 may be configured to probe (e.g., scan, investigate, track, supervise, check, audit) the central database 640 and the blockchain database 660 in response to achieving a monitoring criterion. The monitoring criterion may include a benchmark parameter, condition, stipulation, or threshold that, when achieved, initiates probing of the central database 640 and the blockchain database 660. For instance, the monitoring criterion may include a temporal period (e.g., 1 minute, 5 minutes, 10 minutes, an hour), an ongoing basis (e.g., continuous), a triggering event (e.g., threshold number of inserts, updates, or deletes with respect to the set of central data or the set of benchmark data) or the like. In response to achievement of the monitoring criterion, the IDT-DS 620 may be configured to examine the central database 640 and the blockchain database 660 to ascertain whether or not an inconsistency (e.g., discrepancy between a portion of the set of central data and the corresponding set of blockchain data) is present. As described herein, detecting the inconsistency may include comparing the set of central data with the set of blockchain data to determine whether a data value of the set of central data deviates from the corresponding data value stored in the set of blockchain data may be threshold degree. In embodiments, comparing may include examining the data value indicated by the set of central data with the corresponding data value indicated by the copies of the blockchain database maintained by the plurality of distributed compute nodes 665. Other methods of utilizing the IDT-DS 620 to detect inconsistencies with respect to the central database 640 and the blockchain database 660 are also possible.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method for managing a database management system (DBMS), the method comprising:

structuring, with respect to the DBMS, a central database to include a set of central data;
constructing, with respect to the DBMS, a blockchain database which is linked with the central database;
establishing, in the blockchain database corresponding to the set of central data of the central database, a set of blockchain data;
receiving, with respect to the DBMS, an access request;
maintaining, in response to receiving the access request, both the central database and the blockchain databases;
determining a mismatch of a first central entry of the central database and a first blockchain entry of the blockchain database, wherein the mismatch is based on a magnitude of discrepancy with respect to a threshold similarity factor; and
recording, in a blockchain permanent log, the mismatch of the first central entry of the central database and the first blockchain entry of the blockchain database.

2. The method of claim 1, further comprising:
mapping a first central entry of the central database to a first blockchain entry of the blockchain database to establish the set of blockchain data.

3. The method of claim 1, further comprising:
receiving, in association with the access request, a valid user authorization to carry-out the access request with respect to the blockchain database.

4. The method of claim 1, further comprising:
detecting an inconsistency of the central database and the blockchain database; and
storing the inconsistency in a permanent log.

5. The method of claim 4, further comprising:
comparing, to detect the inconsistency, the set of central data of the central database with the set of blockchain data of the blockchain database.

6. The method of claim 4, further comprising:
providing, in response to detecting the inconsistency, an alert of the inconsistency.

7. The method of claim 1, further comprising:
compiling, to manage the blockchain database, a set of blockchain database copies for a set of consumer-users.

8. The method of claim 1, further comprising:
generating, in an application program, a set of code to interact with the blockchain database.

9. The method of claim 1, further comprising:
configuring the central database for accessibility by a set of administrator users;
configuring the central database for inaccessibility by a set of non-administrator users;
configuring the blockchain database for inaccessibility by the set of administrator users; and
configuring the blockchain database for accessibility via a smart contract.

10. The method of claim 1, further comprising:
deriving the set of blockchain data from the set of central data, wherein the set of blockchain data is a subset of the set of central data.

11. The method of claim 1, further comprising:
resolving, in association with the access request, a smart contract feature to carry-out the access request with respect to the blockchain database.

12. The method of claim 1, further comprising:
resolving, in association with the access request, a public key cryptography feature to carry-out the access request with respect to the blockchain database.

13. The method of claim 1, further comprising:
resolving, in association with the access request, a private key cryptography feature to carry-out the access request with respect to the blockchain database.

14. The method of claim 4, further comprising:
introducing, separate from both the central database and the blockchain database, a detection engine to detect the inconsistency, wherein the central database and the blockchain database are physically separate.

15. The method of claim 14, further comprising:
probing, by the detection engine in response to achieving a monitoring criteria, the central database and the blockchain database.

16. The method of claim 1, further comprising:
executing, in a dynamic fashion to streamline management of the DBMS, each of:
the structuring, the constructing, the establishing, the receiving, and the maintaining.

17. The method of claim 1, further comprising:
executing, in an automated fashion without user intervention, each of:
the structuring, the constructing, the establishing, the receiving, and the maintaining.

18. The method of claim 1, further comprising:
configuring the central database for accessibility by a set of administrator users;
configuring the central database for inaccessibility by a set of non-administrator users;
configuring the blockchain database for inaccessibility by the set of administrator users;
configuring the blockchain database for accessibility by the set of non-administrator users;
mapping a first central entry of the central database to a first blockchain entry of the blockchain database to establish the set of blockchain data;
receiving, in association with the access request, a valid user authorization to carry-out the access request with respect to the blockchain database;
comparing, to detect an inconsistency of the central database and the blockchain database, the set of central data of the central database with the set of blockchain data of the blockchain database;
determining the mismatch of the first central entry of the central database and the first blockchain entry of the blockchain database; and
recording, in the blockchain permanent log to store the inconsistency, the mismatch of the first central entry of the central database and the first blockchain entry of the blockchain database.

19. A system for managing a database management system (DBMS), the system comprising:
a memory having a set of computer readable computer instructions, and
a processor for executing the set of computer readable instructions, the set of computer readable instructions including:
structuring, with respect to the DBMS, a central database to include a set of central data;
constructing, with respect to the DBMS, a blockchain database which is linked with the central database;
establishing, in the blockchain database corresponding to the set of central data of the central database, a set of blockchain data;
receiving, with respect to the DBMS, an access request;
maintaining, in response to receiving the access request, both the central database and the blockchain databases;

determining, a mismatch of a first central entry of the central database and a first blockchain entry of the blockchain database, wherein the mismatch is based on a magnitude of discrepancy with respect to a threshold similarity factor; and recording, in a blockchain permanent log, the mismatch of the first central entry of the central database and the first blockchain entry of the blockchain database.

20. A computer program product for managing a database management system (DBMS), the computer program product comprising a computer readable storage medium having program instructions embodied therewith, wherein the computer readable storage medium is not a transitory signal per se, the program instructions executable by a processor to cause the processor to perform a method comprising:

structuring, with respect to the DBMS, a central database to include a set of central data;

constructing, with respect to the DBMS, a blockchain database which is linked with the central database;

establishing, in the blockchain database corresponding to the set of central data of the central database, a set of blockchain data;

receiving, with respect to the DBMS, an access request;

maintaining, in response to receiving the access request, both the central database and the blockchain databases;

determining a mismatch of a first central entry of the central database and a first blockchain entry of the blockchain database, wherein the mismatch is based on a magnitude of discrepancy with respect to a threshold similarity factor; and recording, in a blockchain permanent log, the mismatch of the first central entry of the central database and the first blockchain entry of the blockchain database.

* * * * *